Oct. 26, 1965  W. D. HOUGH  3,213,738
CUTTING APPARATUS
Filed April 11, 1963

INVENTOR.
W. D. HOUGH
BY
ATTORNEY

United States Patent Office 3,213,738
Patented Oct. 26, 1965

3,213,738
CUTTING APPARATUS
William D. Hough, Denver, Colo., assignor to Ball Brothers Company Incorporated, Muncie, Ind., a corporation of Indiana
Filed Apr. 11, 1963, Ser. No. 272,447
2 Claims. (Cl. 83—554)

This invention pertains generally to a new and improved cutting apparatus and more particularly to an improved apparatus for cutting extruded plastic tubing.

In the past, many types of apparatus have been employed to sever lengths of hollow plastic tubing from an extruded tube, prior to blow molding the cut lengths into plastic articles such as containers and bottles. One of the problems encountered with these devices has been the frequent breakage of the cutting instrument, especially when cutting some of the newer plastics which, for an equivalent degree of temperature and plasticity, possess greater hardness and toughness. Another problem was that many of the previous types of cutting apparatus could not be employed successfully where a continuously extruded tube was to be severed. For example, it was difficult to obtain an even and undistorted interface at the point where the tubing was severed, due to the continuous advance of the extruded tubing. A further problem with some cutters was that portions of the tubing were sometimes removed by the cutting action so that the resulting article was not within the required weight and dimensional tolerances.

In view of the many difficulties and shortcomings of the methods and apparatus employed heretofore, it was completely unexpected and surprising to discover an apparatus which permits the precise severing of lengths of tubing from even the new, harder and tougher plastics, while at the same time vastly extending the useful life of the cutting blades. Further, the novel apparatus of the invention permits the cutting into lengths of plastic tubing from a continuously extruding parent body. Another advantage provided by the apparatus of the invention is that a sharp and even interface is produced at each cutting without loss of portions of material. Moreover, the above advantages and benefits of the invention are achieved by apparatus which is simple in design and of relatively low manufacturing cost.

Figure 2:
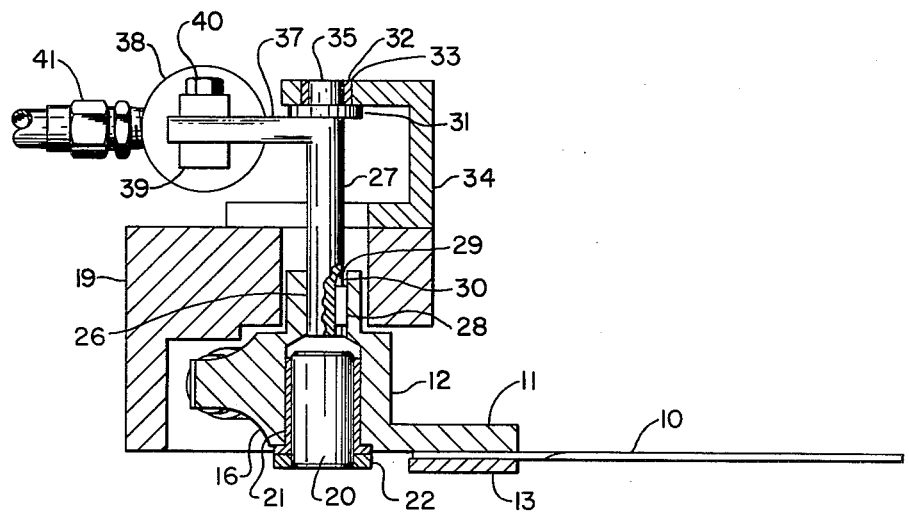
Figure 1:
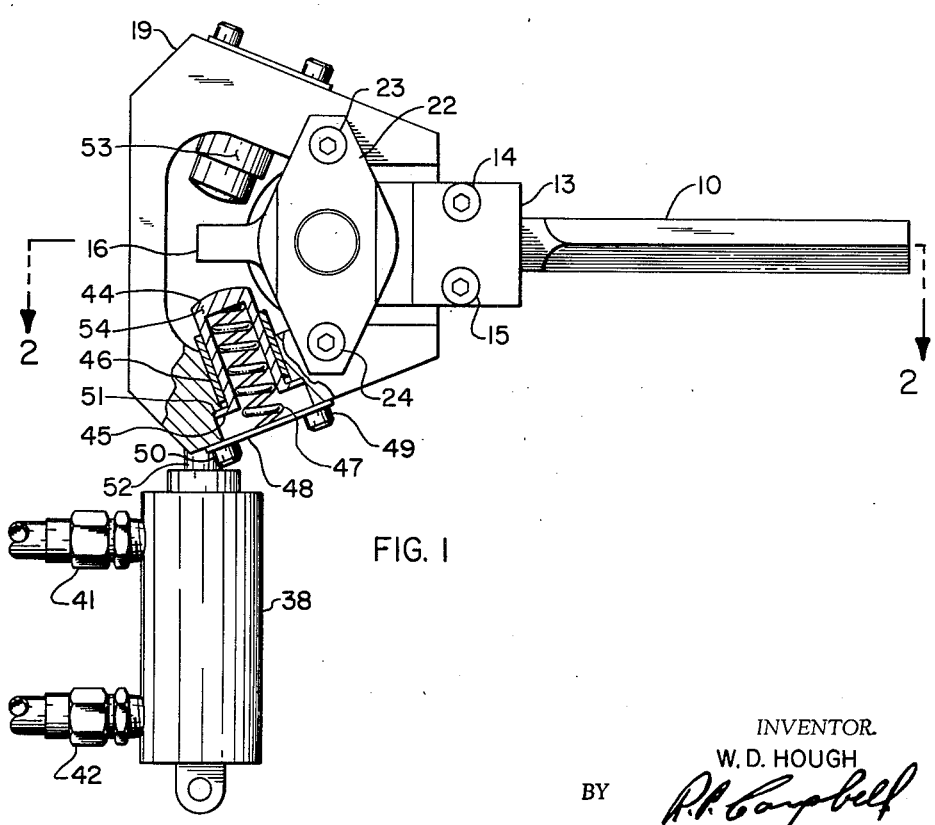

Other features and advantages of the invention will be apparent from the following detailed description of the drawings, in which:

FIGURE 1 is a bottom plan view partially in section of cutting apparatus of the invention; and FIGURE 2 is a sectional view taken along line 2—2 of FIGURE 1.

In the drawings, a cutter blade 10 is secured to extension 11 of member 12 by means of plate 13 and bolts 14 and 15. Member 12 has an arm 16 extending outwardly therefrom at a point opposite to extension 11. Member 12 is rotatably disposed on a pin 20 which engages a bushing 21 contained within the member. The lower portion of pin 20 seats in bottom plate 22 which is secured to cutter frame 19 by means of bolts 23 and 24.

The upper portion of member 12 has an opening 26 into which one end of a crank shaft 27 is positioned and affixed to the member by a key 28 positioned in adjoining key-ways 29 and 30 in crank shaft 27 and member 12, respectively. The other end 35 of crank shaft 27 having a washer 31 and a sleeve 32 disposed thereon is mounted within cylindrical hole 33 in a supporting bracket 34, which bracket is secured to frame 19. Crank arm 37, extending outwardly from crank shaft 27, is pivotably connected to piston rod 52 of double action air cylinder 38 through a toggle joint formed by clevis 39 enclosing crank arm 37, and pin 40 passing through openings in clevis 39 and crank arm 37. Fittings 41 and 42 of fluid lines are attached to double action air cylinder 38 near the end portions thereof for the application of fluid pressure to opposite sides of the piston (not shown).

Spring cage assemblies 53 and 54 are slidably positioned in openings 46 in frame 19 and spaced from, and on opposite sides of, arm 16. Each spring cage assembly includes a spring cage 44 having a cylindrical chamber therein and an outwardly extending flange 45 at its open end. A bushing 43 is disposed between spring cage 44 and the frame 19. Enclosed within spring cage 44 is a spring 47 having one end bearing against the closed end of spring cage 44 and the opposite end bearing against back plate 48 which is secured to frame 19 by means of bolts 49 and 50. Spring cage 44 is retained within the frame by contact between flange 45 and shoulder 51 of frame 19. Preferably, spring 47 is slightly compressed to insure that flange 45 bears against shoulder 51 of frame 19 when cage 44 is in its normal position.

In operation, at the start of cutting stroke, cutter blade 10 is at either extremity of its reciprocatory path and in contact with the closed end of one of the spring cage assemblies. For example, arm 16 may be in contact with spring cage 44 and exerting sufficient pressure against the closed end to force flange 45 of the spring cage into contact with back plate 48 thereby compressing spring 47. When cutter blade 10 is in an extreme position, the piston in the double action air cylinder also is at one extremity of its reciprocatory path and is under sufficient pressure to hold arm 16 against the force of compressed spring 47.

When the fluid pressure in cylinder 38 is reversed suddenly by an impulse to an electric-switch-actuated valve, piston rod 52 substantially instantly applies a force in an opposite direction to crank arm 37. Cutter blade 10 at this time begins a stroke, which is assisted very greatly at the outset by the extension of compressed spring 47 pushing spring cage 44 outwardly toward the arm. When cutter blade 10 has proceeded a short distance along its path, spring cage 44 reaches the limit of its own stroke as flange 45 contacts shoulder 51, and arm 16 now is moved solely by the action of piston rod 52. The action of spring 47 at the outset of the cutting stroke gives cutter blade 10 a greatly increased initial acceleration.

While cutter blade 10 is thus moving through its stroke by the action of piston rod 52, it encounters the tube of plastic, severs same, and moves onward at a high velocity. As arm 16 approaches the end of its path, it contacts spring cage assembly 53 which has an oppositely extending spring cage similar to spring cage 44. The spring cage is pressed toward a back plate (not shown) corresponding to back plate 48.

Since the spring cage has a spring similar to spring 47, the impact of the cage against the back plate is cushioned and relatively small compared to what it would be if the spring were not present. This cushioning of the spring cage 44 is translated to the cantilevered cutter blade 10 and drastically reduces the force upon the blade at the ends of the cutting strokes.

The next stroke of the cutter blade 10 is accomplished in the same manner as described above with spring cage assembly 53 providing assistance in the initial acceleration of the blade and spring cage assembly 54 providing cushioning at the end of the stroke.

The above description shows that the apparatus of the present invention provides a simple and convenient means for neatly and precisely cutting tubing into desired lengths even with hard and tough plastics while at the same time substantially extending the useful life of the cutting blades. Moreover, the novel apparatus of the invention may be employed with continuous extruders without permanently distorting the cut interface of the cut segment or closing the ends thereof. Also, the high speed of the cutting blade of the present apparatus assures a clean cutting operation without loss of material from the tubing.

From the above description of the invention, it will be apparent that various modifications in the apparatus described in detail herein may be made within the scope of the invention. For example, the path of the cutter blade may be in a straight line instead of in an arc. Also, the cushioning of the cutter blade at the end of the stroke may be performed by different devices than those used to accelerate the blade initially. Therefore, the invention is not intended to be limited to the specific details of the apparatus described herein, except as may be required by the following claims.

What I claim is:

1. Apparatus for severing parisons from a continuous tube of heated thermoplastic material issuing from an extruder nozzle, comprising a cutting member having a blade portion and an arm portion, said cutting member being pivotably mounted to reciprocably rotate about a point between said blade portion and said arm portion through an arc path of less than 90° in a plane substantially perpendicular to the longitudinal axis of said tube, compressed spring-actuated thrust members oppositely disposed in the same plane and spaced from each other and arranged with respect to the arm portion of said cutting member so that each thrust member contacts said arm portion only for separate portions of its arc path at the beginning of each reciprocation and the end of each reciprocation, a crank arm attached to said cutting member at its pivot point, and a double-action air cylinder arranged to turn said crank arm and reciprocably drive said cutting member about its pivot point through said arc path.

2. Apparatus for severing parison from a continuous tube of heated thermoplastic material vertically issuing from an extruder nozzle, comprising a cutting member having a double-edged blade portion and an arm portion, said cutting member being pivotably mounted to reciprocably rotate about a point between said blade portion and said arm portion through an arc path of less than 90° and in a substantially horizontal plane, a pair of coiled springs, a pair of thrust members oppositely disposed laterally in substantially the same plane and spaced from each other, said thrust members each enclosing one of said springs and arranged as spring cages to move in the direction of the longitudinal axis of said coiled spring in response to force of said spring and force exerted by the arm portion of said cutting member, each of said thrust members and spring assemblies being arranged with respect to the arm portion of each cutting member so that each thrust member contacts said arm portion only for separate portions of its arc path at the beginning of each reciprocation and the end of each reciprocation, a crank arm attached to said cutting member at its pivot point, and a double-action air cylinder arranged to turn said crank arm and reciprocably drive said cutting member about its pivot point through its arc path.

References Cited by the Examiner

UNITED STATES PATENTS

| | | | |
|---|---|---|---|
| 1,271,537 | 7/18 | Bright. | |
| 1,765,552 | 6/30 | Von Reis | 83—597 |
| 1,996,813 | 4/35 | Jeppsson | 30—228 |
| 2,040,262 | 5/36 | Kruckenberg. | |
| 2,172,346 | 9/39 | Burns | 267—75 |
| 2,579,750 | 12/51 | Merwin | 83—578 |
| 2,602,507 | 7/52 | Adams | 83—587 |
| 2,888,075 | 5/59 | Davidson | 83—578 |

FOREIGN PATENTS

| | | |
|---|---|---|
| 323,909 | 1/35 | Italy. |

ANDREW R. JUHASZ, *Primary Examiner.*